United States Patent [19]

Branchick et al.

[11] 4,436,601
[45] Mar. 13, 1984

[54] METAL REMOVAL PROCESS

[75] Inventors: Kenneth J. Branchick, Mentor; Irving Nalkin, University Hts., both of Ohio; Mary R. Suchanski, Rochester, N.Y.

[73] Assignee: Diamond Shamrock Corporation, Dallas, Tex.

[21] Appl. No.: 286,565

[22] Filed: Jul. 24, 1981

[51] Int. Cl.³ .............................................. C02F 1/46
[52] U.S. Cl. .................................. 204/149; 204/284; 204/DIG. 13; 204/290 R
[58] Field of Search ........... 204/149, 284, 152, 290 R, 204/DIG. 13, 106, 114, 112

[56] References Cited

U.S. PATENT DOCUMENTS

| | | | |
|---|---|---|---|
| 3,846,300 | 11/1974 | Inoue | 204/149 |
| 3,954,594 | 5/1974 | Recht | 204/263 |
| 4,197,181 | 4/1980 | Portal et al. | 204/283 |
| 4,226,685 | 10/1980 | Portal et al. | 204/149 X |
| 4,370,214 | 1/1983 | Kadija | 204/284 X |

OTHER PUBLICATIONS

Tentorio et al., "Characterization of Reticulate, Three Dimensional Electrodes", Journal of Applied Electrochemistry, 8, (1978), pp. 195–205.

*Primary Examiner*—G. L. Kaplan
*Assistant Examiner*—Nam X. Nguyen
*Attorney, Agent, or Firm*—John P. Hazzard; Bruce E. Harang; Arthur S. Collins

[57] ABSTRACT

This disclosure is directed to a membrane or diaphragm-free, electrolytic process for removal of a significant portion of at least one metal contaminant from waste water containing it comprising contacting said waste water with a plurality of anodes, each anode having openings to permit the flow of waste water therethrough, and a plurality of metallized organic polymer foam reticulate cathodes wherein said anodes and reticulate cathodes are arranged in alternating manner and electrically energized.

11 Claims, 6 Drawing Figures

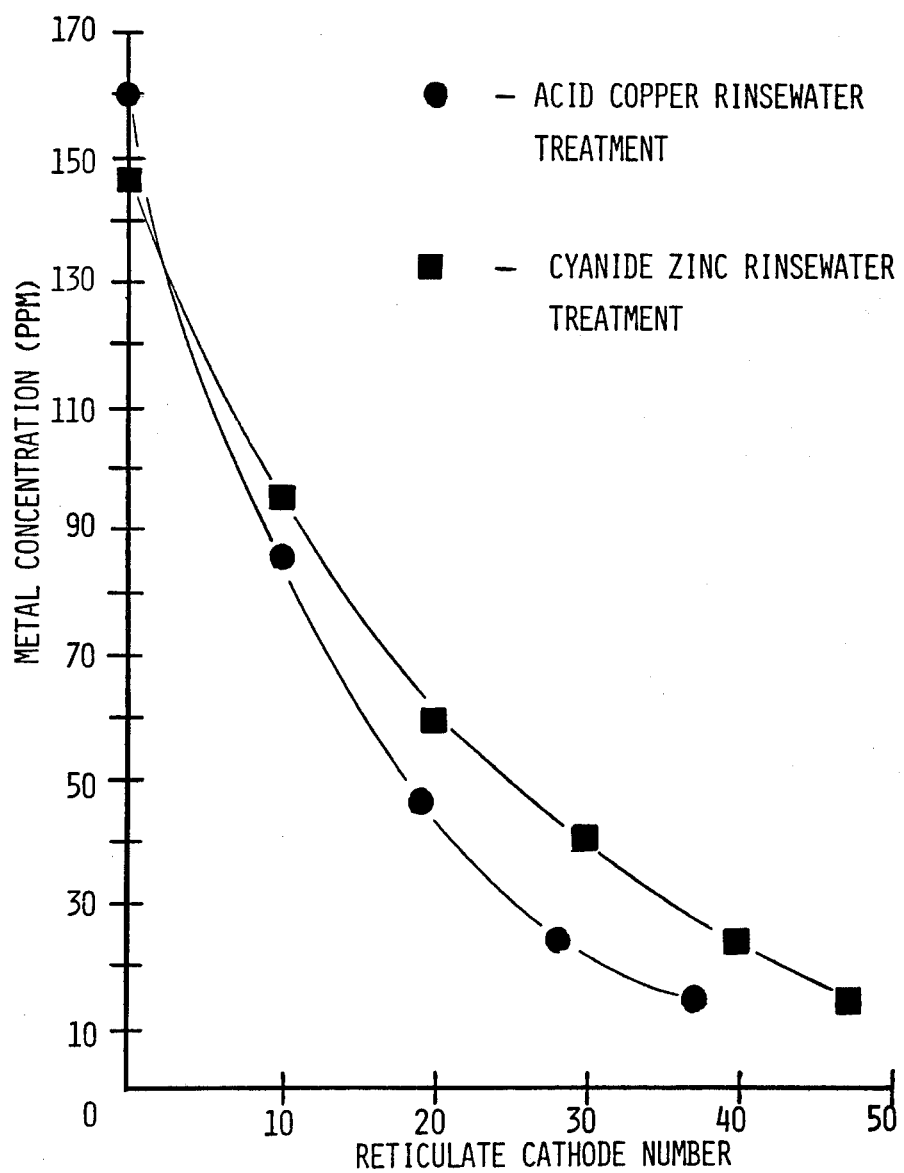
FIG. 2 METAL CONCENTRATION VS. RETICULATE CATHODE NUMBER FOR THE ACID COPPER AND CYANIDE ZINC RINSEWATER TREATMENT SYSTEMS

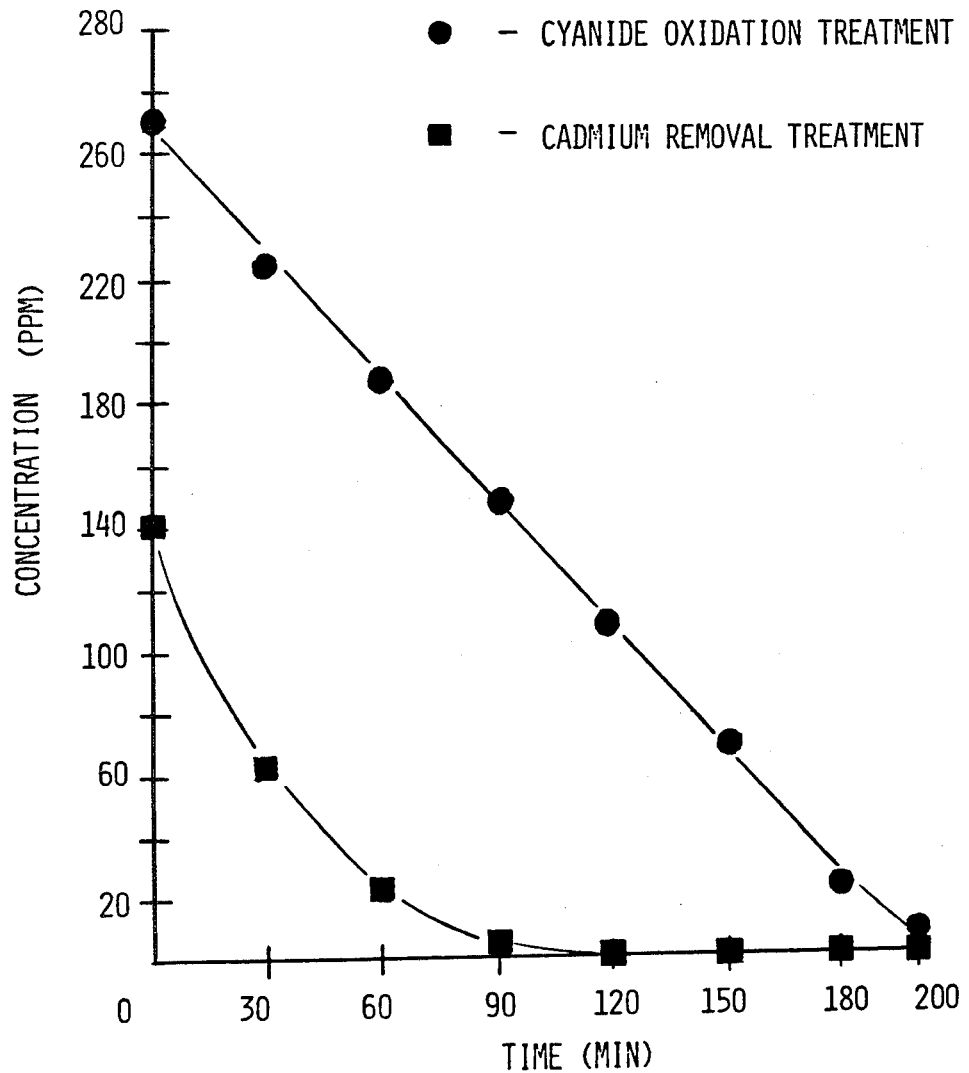
FIG. 3 CONCENTRATION VS. TIME FOR THE CADMIUM CYANIDE TREATMENT SYSTEM

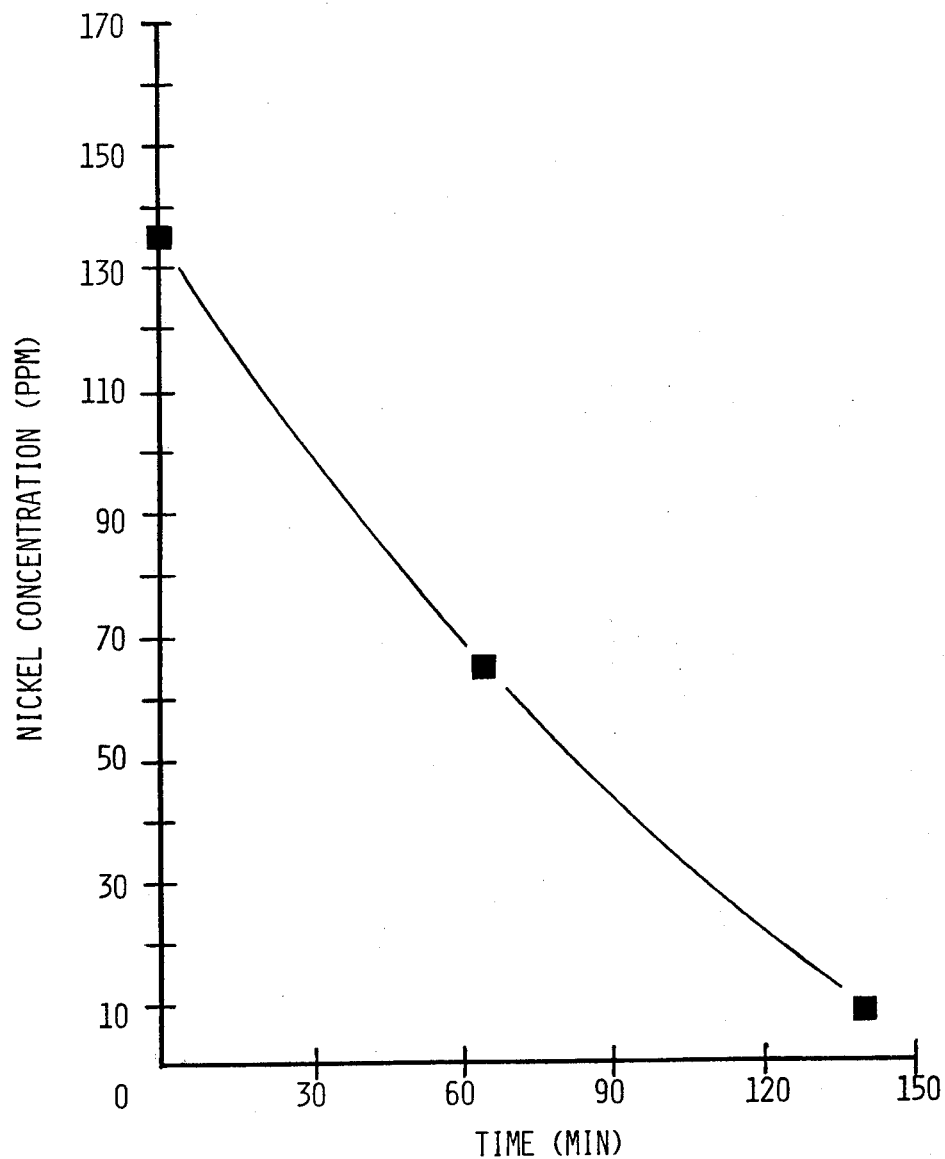
FIG. 4  METAL CONCENTRATION VS. TIME FOR THE WATTS NICKEL RINSEWATER TREATMENT SYSTEM

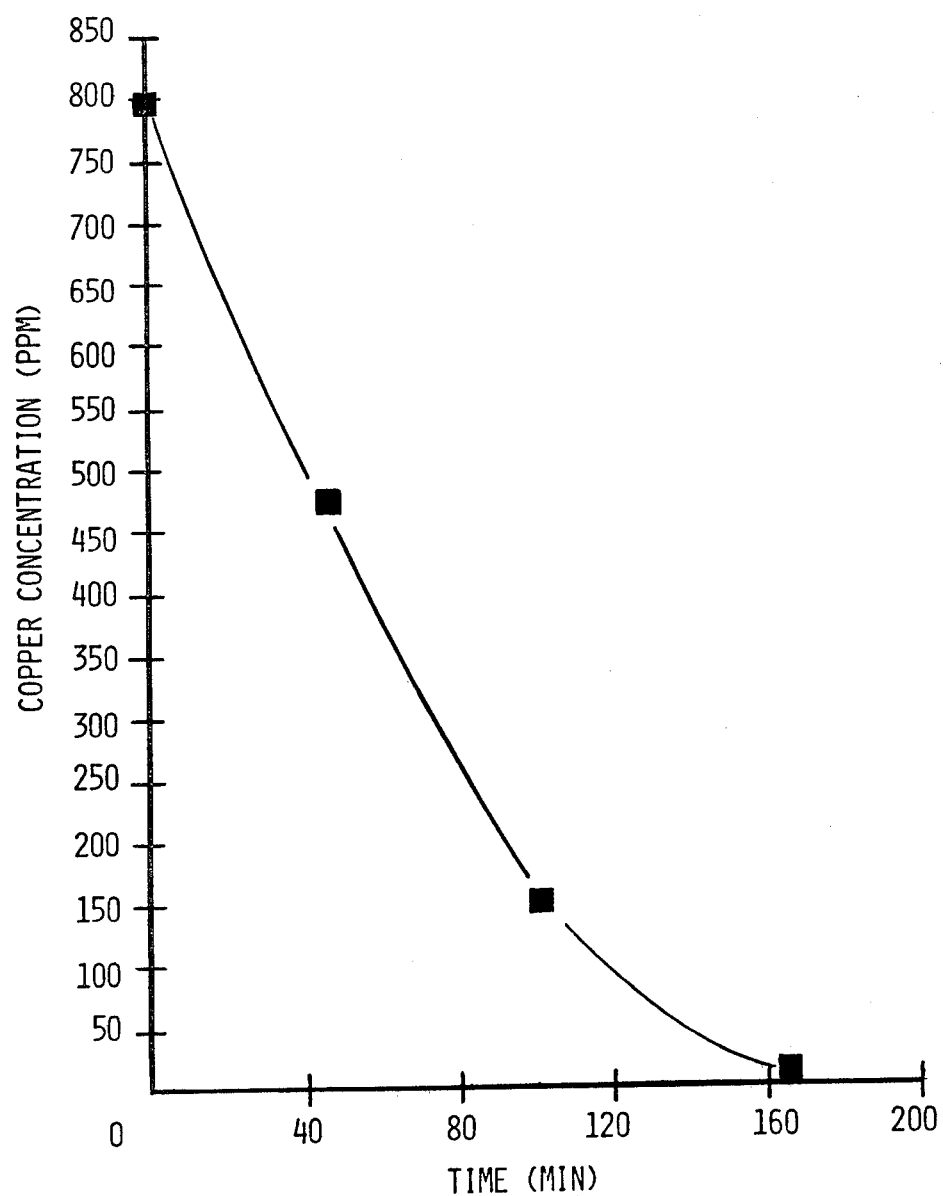
FIG. 5 COPPER CONCENTRATION VS. TIME FOR THE AMMONIACAL COPPER ETCHANT RINSEWATER TREATMENT SYSTEM

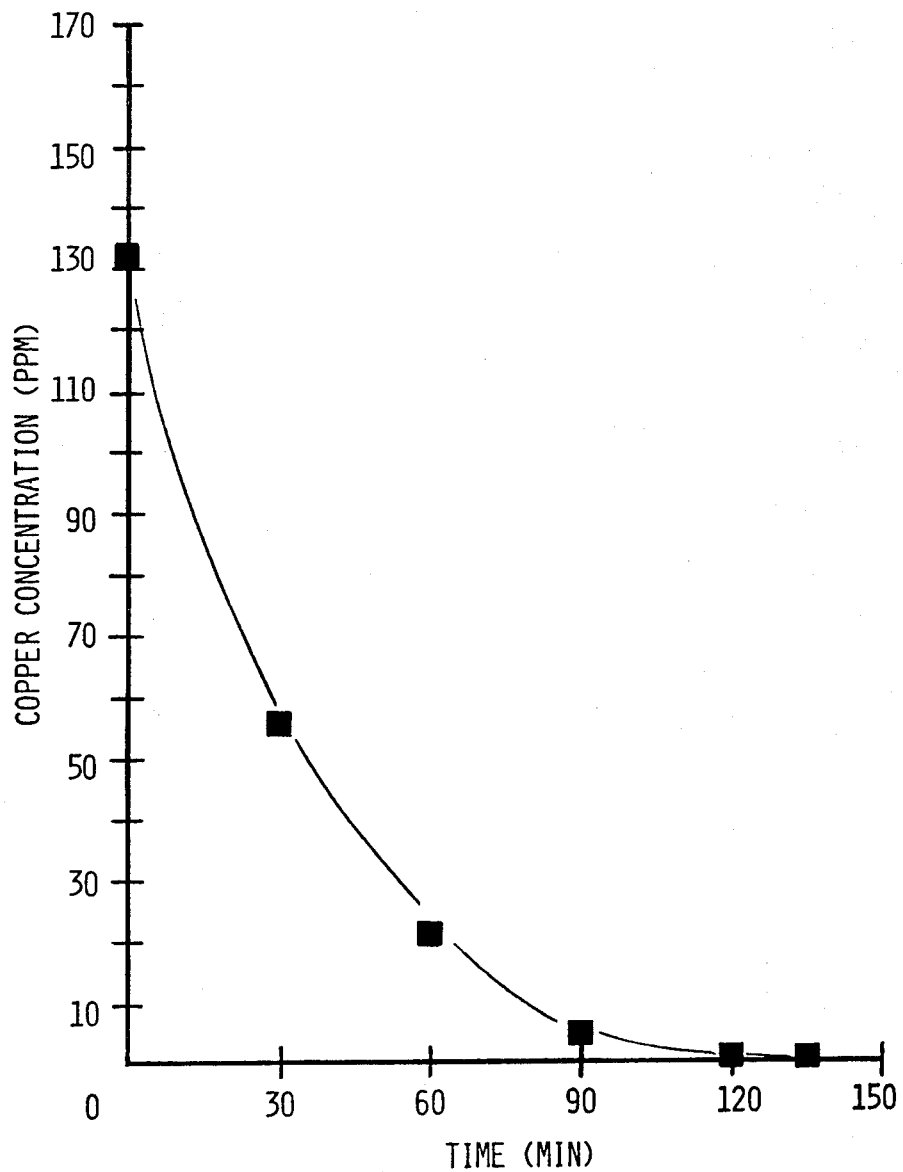
FIG. 6 COPPER CONCENTRATION VS. TIME FOR THE COPPER ELECTROLESS RINSEWATER TREATMENT SYSTEM

METAL REMOVAL PROCESS

BACKGROUND OF THE INVENTION

This invention is directed to a membrane and diaphragm-free process for reducing the concentration of metal(s) in aqueous solutions of plating wastes, particularly those involving metal plating operations using copper, cadmium, zinc, nickel and related metals. According to this invention, the metal plating waste aqueous solution containing the metal(s) desired to be reduced in concentration is passed into contact with a plurality of anodes having openings therein to permit the flow of waste water therethrough and a plurality of reticulated cathodes in an electrolytic cell wherein each reticulated cathode is comprised of an organic polymer foam substrate containing an electroless then electrolytic deposit of metal or alloy on and within the pores of said foam. In accordance with one embodiment of the invention, concurrent metal removal and cyanide destruction are conducted using a combination of metallized organic polymer foam reticulate electrodes for both anodes and cathodes in a recirculating (recycle) mode. The process of this invention permits removal of a significant portion of metal and facilitates metal recovery from plating waste waters in a form whereby the recovered metal can be recycled for subsequent use.

There is considerable and growing concern over pollution of the nations' waterways with various contaminants such as the heavy metals, e.g., copper, nickel, zinc, mercury, cadmium, etc., and such nonmetallic contaminants as cyanide as well as complexes of the foregoing metals with cyanide, etc. Many of these pollutants enter the nations' waters from industrial sources, such as metal finishing or plating plants and from mining sources. Environmental legislation and regulations, on the federal, state and local government levels, have set forth maximum allowable concentrations of these contaminants which may be discharged into public waters. A clear present need exists for an economical yet effective process for treating such waste waters to permit removal of a substantial portion of contaminants, especially with respect to platers' rinse water, which customarily contains one or more of the aforementioned metals as such or in combination with cyanide.

Aqueous plating wastes comprise various aqueous solutions containing silver, copper, cadmium, mercury, zinc, nickel and other metals with or without cyanide. These plating wastes must be treated prior to discharge.

Presently the most common method for removing or reducing the concentration of metals from aqueous plating waste solutions prior to their disposal or discharge is by chemical treatment. Since different metals precipitate and/or are reacted under different conditions, e.g., at different pH levels, utilization of a process for treatment for various plating waste streams is difficult. Furthermore, most chemical treatment methods remove the metal by reaction and subsequent precipitation which causes a metal sludge which must be disposed of. Sometimes this makes for environmental complications. Therefore, it would be desirable to provide a metal removal process capable of reducing significantly the concentration of metal found in platers' rinse waters which is capable of achieving the low tolerable permitted concentrations for discharge or disposal while at the same time recovering the metal in a pure state and not producing any toxic sludges. Also economic considerations call for a metal treatment process wherein the platers' rinse waters can be treated preferably by a one-pass procedure, viz., one which does not require recirculation of the platers' rinse water through the equipment employed to conduct the metal removal process.

The present invention provides a process for electrolytically reducing the concentration of the desired metal(s) present in the platers' rinse water enabling a single pass or a recycling system through the equipment which contains a plurality of anodes and cathodes, with at least each cathode being comprised of an open cell (interconnected cell) organic polymer foam substrate upon which have sequentially been deposited an electroless then an electrolytic metal layer appropriate to cause cathodic deposition of the metal sought to be removed or whose concentration is sought to be significantly reduced so as to enable the effluent to be discharged without requiring further treatment.

Electrolytic attempts to remove metals, such as those described above, from platers' aqueous rinse waters are known. For example, U.S. Pat. No. 3,954,594 to Howard L. Recht is directed to a two-compartment electrolytic cell wherein heavy metals are deposited upon electrically conductive particles located in a cathode compartment. Separate from the cathode compartment there is an anode compartment also containing a bed of electrically conductive particles which is employed to neutralize, viz., by oxidation, cyanide also contained in the waste water. Upon passage of a direct electric current between the two compartments, heavy metal is deposited upon the particles in the cathode compartment and the cyanide is oxidized in the anode compartment.

U.S. Pat. No. 4,197,181 issued to Charles Portal et al is directed to a stationary particulate bed dual electrode utilizing a stationary bed of carbonaceous particles to remove metals from aqueous rinse waters. This Portal et al electrode also incorporates a foam filter element, e.g., low density polyurethane foam, to filter particulate material present in the electrolyte solution. At column 5, lines 61 to 62, it is stated that fibrous mats of graphite carbon or carbon felt may be substituted for the carbonaceous particles. The carbonaceous particles, e.g., coke, are held in place in the compartment by an interface liner, e.g., synthetic filter cloth. The Portal et al stationary particulate bed dual electrode employs two stationary particulate bed electrode assemblies adapted for mating to one another in an electrically connected relationship. When so mated, the electrode assemblies create an internal cavity for the introduction of metalic ion containing solutions from which the metal values are to be extracted.

U.S. Pat. No. 4,226,685 issued to Charles Portal et al (a continuation-in-part application of U.S. Pat. No. 4,197,181) is directed to a method of treating plating wastes containing at least one heavy metal and (optionally) cyanide ions such that ionic contaminants, e.g., copper, are reduced to concentrations of 33 parts per million (one pass) and 15 parts per million (two passes) compared with the initial concentration (prior to contact with said electrodes) of 150 parts per million (as cupric sulfate). The deposited copper is deposited on the particulate stationary bed of carbonaceous particles, e.g., charcoal particles, and the beds are disassembled so the metal-plated carbonaceous particles can be removed and replaced. At column 6, lines 19 to 22, it is stated that the metal loaded cathodes may be treated by conventional purifying techniques to obtain useful metals and alloys or plating solutions.

An article entitled "Characterization of Reticulate, Three-Dimensional Electrodes" by A. Tentorio et al published in the *Journal of Applied Electrochemistry* 8 (1978) pages 195 to 205 is directed to electrodes prepared from open cell polyurethane foam upon which there is deposited copper, first by electroless deposition followed by electrolytic deposition. In FIG. 3 of the Tentorio et al article, there is shown an exploded view of an electrolytic cell utilizing such a copper plated polyurethane foam reticulate electrode (cathode) in conjunction with a lead/lead oxide counter-electrode (anode) separated by an ion exchange membrane. The solution to be treated i.e., the copper bearing rinse water as described by the article, is pumped through the catholyte compartment of the cell. A separate anolyte solution of $1MH_2SO_4$ was pumped independent of the catholyte through the anolyte compartment of the cell. At page 205 of the Tentorio et al article, the authors state that the cell of FIG. 3 could operate in a waste water treatment system only with multiple pass electrolysis, and only with the level of concentration of polutant, i.e., copper, after treatment not below tens of parts per million in order not to weight down excessively the recycle. Thus it seems clear that the authors contemplate the use of such copper plated polyurethane foam reticulate electrodes only in cases where the waste water to be treated is to be subjected only to multiple pass electrolytic treatment through a cell separated by an ion exchange membrane into an anolyte and catholyte chamber and where the desired concentration of polutants in the effluent water from the treatment process is at least counted in terms of tens of parts per million.

SUMMARY OF THE INVENTION

The present invention is directed to a membrane or diaphragm-free method for treating aqueous plating wastes containing at least one metal and (optionally) concurrently removing (by oxidizing) cyanide therefrom such that the metalic contaminant and cyanide are reduced to sufficiently low concentrations to permit discharge. The process of this invention permits the removed metal(s) to be accumulated on the metal plated organic polymer foam open cell reticulate electrodes in a manner well suited to recovery of said metal by heating the spent electrode to pyrolyze off the organic portion thereof. The process of this invention also contemplates the use of a combination of conventional anodes with the plated reticulate electrodes having an organic polymer foam substrate containing open (interconnected) pores. The process of this invention permits significant reduction in the content of metals present in platers' rinse waters or other aqueous streams in fairly low concentration, viz., 200 to 100 mg/liter (equivalent to the same number of parts per million). Reductions in content of the metals desired to be removed have been achieved by use of the process of this invention to an extent so as to be able in a single-pass to reduce said metal concentrations from an initial concentration of 140 to 180 parts per million to effluent concentrations of 5 to 25 parts per million.

When it is desired to concurrently remove not only a metal contaminant but also to oxidize cyanide present in the platers' rinse water, it is preferable to recycle the rinse water in a closed loop rinse system. The metal and cyanide concentrations coming out of the cell are characteristically lowered significantly enough to be used as fresh rinse water. In such cases, reticulate anodes, e.g., nickel plated organic polymer foam reticulate electrodes, are utilized to oxidize the cyanide to cyanate. This concurrent treatment process is used at highly alkaline pH, viz., at pH values ranging from above about 11, e.g., from about 11+ to about 13.

BRIEF DESCRIPTION OF THE DRAWINGS

FIG. 2 is a plot of metal concentration versus number of reticulate cathodes for the acid copper and cyanide zinc rinse water treatment systems.

FIG. 3 is a plot of metal and cyanide concentration versus treatment time for the cadmium cyanide treatment system.

FIG. 4 is a plot of metal concentration versus treatment time for the Watts Nickel rinse water treatment system.

FIG. 5 is a plot of copper concentration versus treatment time for the ammoniacal copper etchant rinse water treatment system, and FIG. 6 is a plot of copper concentration versus treatment time for the copper electroless rinse water treatment system.

DETAILED DESCRIPTION OF THE INVENTION

Figure 1:
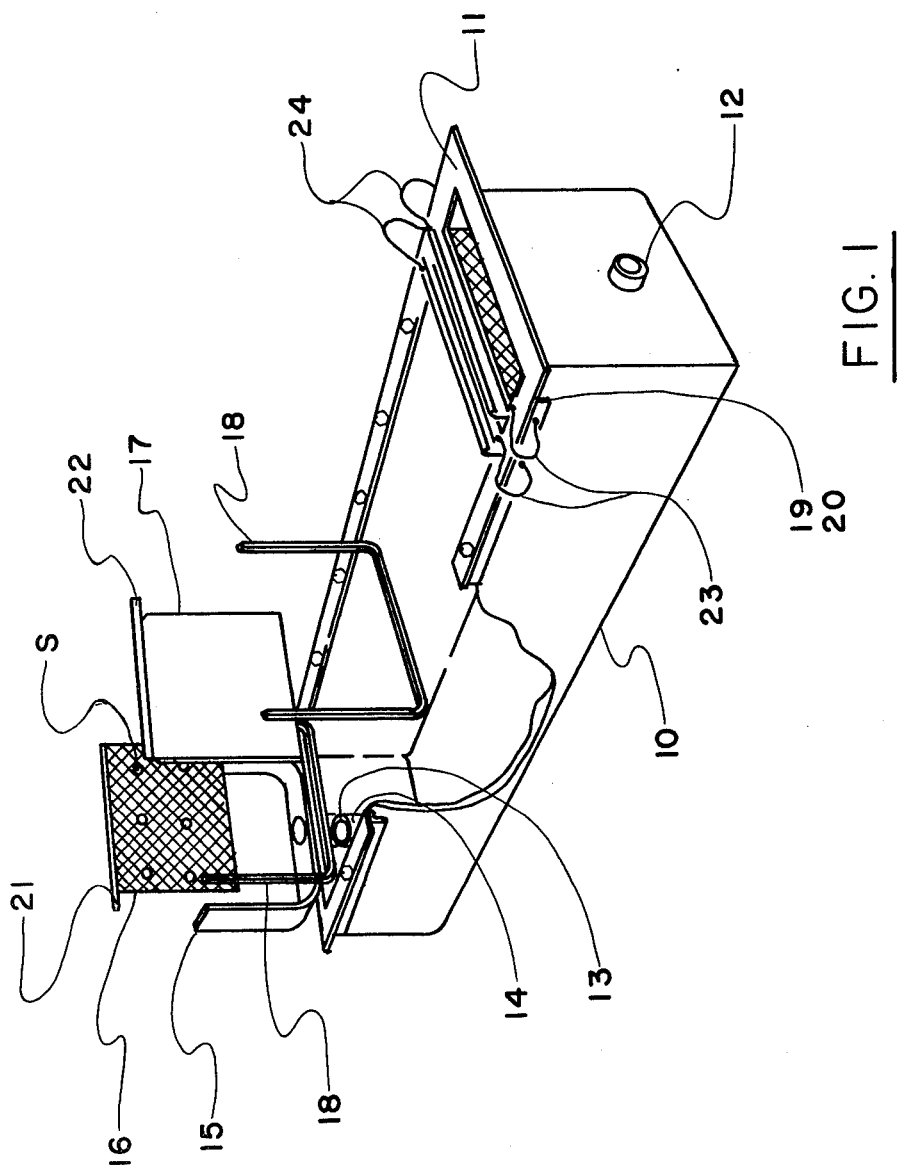
FIG. 1 of the drawing is a perspective view of an electrolytic cell used in accordance with the metal removal process of this invention with a portion being shown in exploded perspective, and the other portion shown assembled for use in the electrolytic cell. This electrolytic cell is described and claimed in U.S. Pat. No. 4,399,020 filed in the names of Kenneth J. Branchick, Irving Malkin, Robert C. Sutter, Karel A. Korinek and Mary R. Suchanski of even date herewith and entitled "Device for Waste Water Treatment."

The process of this invention will be described in detail in conjunction with the apparatus of FIG. 1 for conducting said process. As indicated in FIG. 1, cell box 10, which can be made of "ROTOMOLDED" cross-linked polyethylene, polypropylene, or other equivalent plastic material, has an upper flange 11 therearound. Plastic, e.g., polyvinyl chloride, inlet nozzle 12 and outlet nozzle 13, arising from standpipe 14 permit ingress and egress of the waste water to be treated by the cell. Endspacers 15 of polyvinyl chloride or equivalent nonconductive material are present at either end of the cell box. As noted in the figure, endspacer 15 at one end of the cell box fits over standpipe 14. Anodes 16, which may be of the dimensionally stable type, are separated from reticulate metallized organic polymer foam cathodes 17 at their outer periphery by nonconductive intermediate spacers 18 which may be made from polyvinyl chloride or equivalent plastic material. Plastic, e.g., nylon isolator snaps S (known in the art) can be used to aid in separating the main body portions of anodes 16 from the cathodes 17. Anode busbar 19 can be positioned on one undersurface of cell box flange 11 and correspondingly cathode busbar 20 can be positioned similarly on another, e.g., the opposite undersurface of the flange 11. Anode contact bars 21 with extensions are positioned on the upper portion of anodes 16 to effect contact with the respective anode busbar 19 and correspondingly cathode contact bars 22 with extensions are positioned in the upper portion of cathodes 17 to serve as a means for electrical connection with cathode busbar 20. When metallized organic polymer foam reticulate cathodes are employed, generally U-shaped, sheet metal, e.g., galvanized sheet cathode contact bars 22 are used and secured to the upper portions of said reticulate cathodes by slipping them over said cathodes and pinching or pressing said sheets at selected portion(s) of or across their entire length(s) so as to hold the upper portions of said reticulate cathodes securely fastened. Respective anode terminal connectors 23 and cathode terminal connectors 24 are utilized to achieve the connection of the anode contact bars with the anode busbar and the cathode contact bars with the cathode busbar, respectively. A cell cover plate (not shown) can be utilized to effect closure of the electrolytic cell. Such a cell cover plate is not required, however. The size and the number of the anodes and cathodes, respectively, employed in the process of this invention, will depend upon the volume of platers' rinse water to be treated as well as the type and concentration of contaminant(s) contained in such platers' rinse water and the desired level thereof in the effluent in conjunction with the treatment time for which a given volume thereof is in contact with the active electrolytic elements positioned within the cell box.

According to the process of this invention, the anodes 16 located within cell box 10 can be of a variety of types. Consumable anodes can be employed, e.g., graphite, lead, magnesium, aluminum, nickel, etc., or stable anodes, e.g., dimensionally stable anodes such as those having a substrate of titanium or other valve metal with comparatively thin metal, metal alloy, or metal oxide coating(s) of precious metals, e.g., iridium, tantalum, ruthenium, etc., or coatings of nonprecious metal oxide(s) of lead, manganese, etc., thereon. Moreover, some or all of the anodes 16 can be reticulate metal-plated organic polymer foam electrodes, e.g., nickel-plated polyurethane foam for use in cyanide oxidation. According to another embodiment of this invention, at least one, more or all of the anodes can be made of carbon or lead having openings or perforations to allow flow of waste water through such anode(s).

In accordance with one preferred embodiment of this invention, dimensionally stable anodes are utilized having a titanium substrate to which an alloy coating of iridium/tantalum has been applied by known procedures. One such dimensionally stable anode is that commercially available under the designation "TIR-2000 ®." "TIR-2000" is a registered trademark of Diamond Shamrock Technologies of Geneva, Switzerland.

RETICULATE ELECTRODES

The open cell organic polymer foam substrate which is used should be one having mostly interconnected pores, viz., of the open cell type. Suitable organic polymer foam substrate materials which can be employed include, but are not necessarily limited to, polyurethane foam, the open cell polyurethane foams such as Scott Industrial Foam, Q version; Scott Industrial Foam, PVC coated; Scottfelt foam; polyether urethane foam; polyester urethane foam; etc. The organic polymer foam substrate material can have pore sizes ranging from about 10 to about 100 mils, viz., 0.010 to about 0.100 inch. Usually, however, the average pore size of the interconnecting cell organic polymer foam substrate ranges from about 20 to about 40 mils, viz., 0.020 to about 0.040 inch. The size referred to as "pore size" is the average diameter of the foam pores prior to the first, viz., electroless, deposition procedure. Such foam substrates characteristically contain from about 20 to about 45+ pores per inch (ppi).

The reticulate cathodes 17 are prepared by first electrolessly then electrolytically plating the desired metal, e.g., copper, nickel, silver, gold, etc., or alloys of metals can be deposited upon the organic polymer foam substrate, e.g., bronze and brass. Characteristically, the total thickness of the metal layer applied both electrolessly then electrolytically can range from about 0.10 to about 0.50 mil and more usually ranges from about 0.2 to 0.4 mils total thickness. The plating of the metals, both electrolessly then electrolytically is usually performed at ambient room temperatures, however, higher or lower temperatures can be used.

The platers' rinse waters can then be fed through inlet nozzle 12 into contact with the plurality of anodes and cathodes utilizing the apparatus as shown in the drawing. Usually this purification procedure is conducted at currents ranging from 100 to 600 amps of corresponding voltages of 2 to 6 volts at ambient room temperatures for time periods sufficient to allow adequate contact of the platers' rinse water to be treated with the anodes and cathodes whose use is contemplated herein.

The invention will be discussed in additional detail in the examples which follow. In these examples, all parts, percents and ratios are by weight unless otherwise indicated. All metal concentrations were determined using standard atomic absorption techniques. Cyanide and cyanate concentrations (where applicable) were determined according to titration methods known in the art. All calculations (where applicable) were performed with the selected figures from the upper stated value of any given range.

EXAMPLE 1

Fabrication of Cu Metallized Foam Reticulate Electrode

The polyurethane foam substrates are metallized with copper electrolessly then electrolytically in a similar manner. The organic polymer foam, e.g., polyurethane, substrate, Scott Industrial Foam (Q version) having 30 pores per inch (ppi) and an averge pore diameter of 33 mils, has a layer of copper deposited electrolessly thereon by immersion into the below described electroless copper plating bath for time periods ranging from 2 to 25 minutes at ambient temperatures. Typically, the electroless deposition of copper was applied by immersing the organic polymer foam substrate in the electroless plating bath from 15 to 25 minutes at room temperatures, viz., 15° to 30° C.

Prior to immersing the polyurethane foam into the electroless copper plating bath, it is treated with a sensitizing material and then a catalyzing material to render it receptive to deposition of the electroless copper plating. Thus, the polyurethane substrate is immersed at room temperature for 2 to 10 minutes into an aqueous sensitizing solution containing stannous chloride and hydrochloric acid in water. Typically, the sensitizing baths contained from 5 to 15 grams per liter of anhydrous stannous chloride, viz., $SnCl_2$, and from 0.005 to 0.015 gram per liter of hydrochloric acid, viz., HCl. It was thoroughly rinsed and then immersed for 2 to 10 minutes into an aqueous catalyzing solution containing palladium chloride and hydrochloric acid in water. The catalyzing bath contained from 0.2 to 1.0 gram per liter of palladium chloride, viz., $PdCl_2$, and from 0.005 to 0.15 gram per liter of hydrochloric acid. The foam was then thoroughly rinsed with water and was ready for the electroless copper deposition.

Then as noted, the prepared organic polymer foam substrate was immersed into the electroless bath, maintained at ambient temperatures, viz., 15° to 30° C. The electroless plating bath contained from 10 to 15 grams per liter of cupric sulfate pentahydrate, from 50 to 55 grams per liter of sodium potassium tartrate, from 8 to 13 grams per liter of sodium hydroxide, and from 18 to 23 grams per liter of formaldehyde. The copper electroless plating bath was prepared suitably by adding the aforementioned components to water in which the mixture is agitated to obtain thorough dissolution of the components.

The organic polymer foam substrate prepared as indicated above was electrolessly plated using the above-stated conventional electroless plating bath followed by electrolytic plating using a conventional copper electroplating bath such as the below tabulated acid-sulfate copper bath. Consumable Cu anodes (copper sheets) were used to maintain bath compositions.

| Constituent | Range | Nominal Value |
| --- | --- | --- |
| Cupric Sulfate Pentahydrate g/l $CuSO_4.5H_2O$ | 35–45 | 40 |
| Sulfuric Acid g/l $H_2SO_4$ | 10–25 | 15 |
| Temperature °C. | 15–30 | 20 |
| Current Density amp/$ft^2$ | 25–100 | 75 |
| Plating Time min | 30–60 | 45 |

The resulting copper reticulate electrodes contained approximately 100 grams of copper per 15"×18"×¼" reticulate electrode and are suitable for use as the cathodes in the process of this invention. Characteristically the Cu (or other metal plating) ranges from about 0.1 to about 0.3 grams per cubic centimeter of foam substrate.

EXAMPLE 2

Nickel Reticulate Electrode Fabrication

Polyurethane foam substrates as in Example 1 were metallized with nickel electrolessly then electrolytically in a similar manner to the procedure for fabrication of copper reticulate electrodes as in Example 1 to yield polyurethane foam Ni metallized electrodes containing approximately 100 grams of nickel per 15"×18"×¼" reticulate electrode.

The organic polymer foam, e.g., polyurethane, substrate has a layer of nickel deposited electrolessly thereon by immersion into the electroless nickel plating bath for time periods ranging from about 2 to 60 minutes of temperatures ranging from about 15° C. to about 60° C. Usually, however, the electroless deposition of nickel is applied by immersing the organic polymer foam substrate in the electroless plating bath from 5 to 10 minutes at temperatures from ambient room temperature, viz., about 20° C., to about 35° C.

Prior to immersing the polyurethane foam in the electroless nickel plating bath, it must be treated with a sensitizing material, and then a catalyzing material to render it receptive to deposition of the electroless nickel plating. Thus, the polyurethane substrate is immersed at room temperature into a sensitizing solution of an aqueous nature containing stannous chloride and hydrochloric acid in water, it is thoroughly rinsed, it is immersed into a catalyzing solution of an aqueous nature containing palladium chloride and hydrochloric acid in water, it is thoroughly rinsed, then it is ready for the electroless nickel deposition. Characteristically, the polyurethane substrate is immersed into the sensitizing bath and the catalyzing bath for 2 to 10 minutes at ambient temperature. Typically, the sensitizing bath contains from 5 to 15 grams per liter of anhydrous stannous chloride, viz., $SnCl_2$, and from 0.005 to 0.015 gram per liter of hydrochloric acid, viz., HCl. The catalyzing bath contains from 0.2 to 1.0 gram per liter of palladium chloride, viz., $PdCl_2$, and from 0.005 to 0.015 gram per liter of hydrochloric acid, viz., HCl.

Then as noted the prepared organic polymer foam substrate is immersed into the electroless bath customarily maintained at ambient to slightly elevated temperatures, e.g., from 20° C. to about 60° C. The electroless plating bath is composed of two components, one containing nickel chloride, ammonium chloride, sodium citrate and ammonium hydroxide and the other component characteristically contains sodium hypophosphate and water. The electroless plating bath is prepared suitably by first adding the nickel chloride, viz., $NiCl_2·6H_2O$, the ammonium chloride, the sodium citrate and the ammonium hydroxide to the water and the mixture is throughly agitated to obtain dissolution of the components therein. Then the sodium hypophosphite is added to water and agitated to obtain dissolution. Both baths are added together to obtain the nickel electroless plating bath. Characteristically, the electroless plating bath contains from 40 to 50 grams per liter of the hydrated nickel chloride, 45 to 55 grams per liter of ammonium chloride, from 95 to 105 grams per liter of the sodium citrate, from 250 to 275 grams per liter of ammonium hydroxide, and from about 10 to 20 grams per liter of the sodium hypophosphite.

The organic polymer foam substrate as indicated above is electrolessly plated using conventional electroless plating baths for nickel plating followed by electrolytic plating using conventional nickel electroplating baths. The constituents of this bath are nickel sulfate and boric acid. Consumable nickel anodes were used to maintain the bath compositions. A typical composition and range and operating conditions are as follows:

| | Range (g/l) | Nominal Value (g/l) |
| --- | --- | --- |
| Nickel sulfate ($NiSO_4.6H_2O$) | 225–375 | 330 |
| Boric acid ($H_3BO_3$) | 30–40 | 37 |
| Temperature °C. | 45–65 | 60 |
| pH | 4.0–6.0 | 4 |
| Current density | 25–100 amp/$ft^2$ | 50 |

EXAMPLE 3

Acid Copper Rinse Water Treatment

Copper plated reticulate electrodes prepared according to Example 1 were assembled in an electrolytic cell of the type shown in FIG. 1 and used for the removal of copper from a platers' effluent rinse water stream. The metal cation, $Cu^{2+}$, was plated out as a neutral metal onto the reticulate cathodes. The conjugate anion, $SO_4^{2-}$, was left untreated during these tests. The anode electrochemical reaction was the evolution of oxygen with the subsequent protonation of the rinse water solution. The tests were conducted for a minimum of 200 hours on line. The flow rate of the rinse water solution through the system was 2 gallons per minute in which the system was operated in the single pass mode with the average metal cation inlet concentration of 160 mg/liter producing an average outlet metal cation concentration of 14 mg/liter. The area of plate of one side onto these reticulate cathodes was 0.95 ft$^2$ and 37 cathodes were used in the cell for the tests. Forty-one TIR-2000 electrodes (commercially available dimensionally stable Ti anodes having an Ir/Ta coating thereon) were employed as the anodes. Similarly, the active area of the anodes on one side was 0.95 ft$^2$. Characteristically, the TIR-2000 anode consists of an 0.060 inch thick titanium expanded mesh substrate coated with the oxides of tantalum, iridium and titanium.

Using this metal removal system, reticulate cathode lifetimes of 200 hours were obtained producing an average uptake weight of 1.10 lbs of copper per cathode. The cell current used for the system ranged from 110 to 130 amps producing a cathode current density range of 3.1 to 3.7 amps/ft$^2$ (3.0 to 3.5 A/cathode) based on the area of plate of one side of a cathode. A resulting voltage range of 2.1 to 2.7 volts, a resulting DC power consumption not greater than 2.4 kilowatt hrs/lb of metal removed, and a resulting current efficiency of 43 percent occurred. The average pH of the Cu-containing waste water effluent flowing into the cell was 3.2 and the average pH of the treated effluent leaving the cell was 2.1. FIG. 2 illustrates the metal concentration for the copper removal system as a function of the number of Cu reticulate cathodes employed at the above operating conditions. The average metal removal efficiency of the system was 91 percent.

EXAMPLE 4

Cyanide Zinc Rinse Water Treatment

The reticulate electrode cell system has been used for the removal of zinc from a platers' effluent rinse water stream. The metal cation, $Zn^{2+}$, was plated out as a neutral metal onto the cathode. The conjugate anion, $CN^-$, was left untreated during these tests. The anode electrochemical reaction was the evolution of oxygen with the subsequent protonation of the rinse water solution. The tests were conducted for a minimum of 100 hours on line. The flow rate of the rinse water solution through the system was 2 gallons per minute in which the system was operated in the single pass mode, with the averge metal cation inlet concentration of 147 ppms producing an average outlet metal cation concentration of 15 ppms. The type of cathode employed was the copper plated reticulate polyurethane electrode, as in Example 1, ¼ inch thick with an average pore size of 33 mils, more commonly referred to as the 30 pores per linear inch (30 ppi) type. The area of plate of one side onto the reticulate cathodes was 1.40 ft$^2$ and 46 cathodes were used in the cell for the tests. Fifty-one graphite electrodes were employed as the anodes. Similarly, the active area of the anodes on one side was 1.40 ft$^2$. Characteristically, the graphite electrodes were cut from an extruded block of graphite and fabricated into plates in which holes were drilled to allow solution flow through them.

For this particular system, the cathode lifetime was 100 hours producing an average uptake weight of 0.66 lbs of zinc per cathode. The cell current for the system ranged from 550 to 600 amps producing a cathode current density range 8.5 to 9.3 amps/ft$^2$ (12 to 13 A/cathode) based on the area of plate of one side of a cathode. A resulting voltage range of 4.0 to 5.5 volts, a resulting DC power consumption not greater than 25 kilowatt-hrs/lb of metal removed, and a resulting cathode plating efficiency of 8.2 percent occurred. The average pH into the cell was 12.5 and the average pH out of the cell was 12.2. FIG. 2 illustrates the metal concentration for the zinc removal system as a function of reticulate cathode number at the above operating conditions. The average metal removal efficiency of the system was 90 percent.

EXAMPLE 5

Cadmium Cyanide Rinse Water Treatment

The reticulate electrode cell system has been used for the concurrent removal of cadmium and the oxidation of cyanide to cyanate in a simulated rinse solution. The metal cation, $Cd^{2+}$, was plated out as a neutral metal onto the cathode, and the conjugate anion, $CN^-$, was oxidized to cyanate, $CNO^-$, at the anode.

The tests were conducted as bath operations on the lab scale for 200 minutes with a batch size of 4 gallons (15 liters). The flow rate of the simulated rinse was one gallon per minute in which the system was operated in the recirculating mode with 50 passes made of the system reservoir (4 gal). The initial $Cd^{2+}$ concentration was 141 ppms and the final $Cd^{2+}$ concentration was 0.02 ppm. The initial $CN^-$ concentration was 270 ppms and the final $CN^-$ concentration was 8 ppms with a $CNO^-$ concentration of 395 ppms. The pH was initially set at 12.0 by NaOH addition to the reservoir, and it decreased to 11.8 at the end of the run.

The type of cathode employed was the copper plated reticulate polyurethane electrode, as in Example 1, ¼ inch thick with an average pore size of 33 mils. The area of plate on one side of the reticulate cathodes was 0.16 ft$^2$ and 3 cathodes were used in the cell for these tests. Four 30 ppi nickel plated polyurethane electrodes, prepared as described above by electrolessly then electrolytically plating Scott Industrial Foam (Q version), ¼ inch thick, with a facial area of 0.16 ft$^2$ each, were used as the anodes. The cell current for the system was 3 amps producing a cathode current density of 6.1 amps/ft$^2$ (1.0 amp/cathode) based on the facial area of one side of an electrode. This cell current produced a cell voltage of 2.4 volts. Additionally, the cathode plating current efficiency was 10 percent, the anode cyanide oxidizing current efficiency was 81 percent and the DC power consumption of the cell was 0.006 kilowatt-hrs/gal of batch. FIG. 3 illustrates the $Cd^{2+}$ and $CN^-$ concentrations as a function of time for the runs. The cadmium metal removal efficiency was +99 percent and the cyanide oxidation efficiency was +95 percent.

EXAMPLE 6

Watts Nickel Rinse Water Treatment

The reticulate electrode cell system has been used for the removal of nickel in a simulated rinse solution. The metal cation, $Ni^{2+}$, was electrochemically plated out as a neutral metal onto the cathode, and the conjugate anions, $Cl^-$ and $SO_4^{2-}$, were left untreated for these tests. The anode electrochemical reaction was the evolution of oxygen with the subsequent protonation of the rinse solution.

The tests were conducted as batch operations on the lab scale for 150 minutes with a batch size of 4 gallons (15 liters). The flow rate of the simulated rinse was one gallon per minute in which the system was operated in the reciculating mode with 37 passes made of the system reservoir (4 gal). The initial concentration was 135 ppm, and the final concentration was 8 ppms. The pH of the system was held in the range of 4 to 7 by use of a pH controller. To improve the conductivity of the rinse solution, ammonium sulfate, $(NH_4)_2SO_4$, was added to the reservoir at the concentration of 5 grams/liter. The type of cathode employed was the copper plated reticulate polyurethane electrode, as in Example 1, ¼ inch thick with an average pore size of 33 mils (30 ppi foam). The area of plate of one side onto the reticulate cathodes was 0.16 $ft^2$ and 3 cathodes were used in the cell for these tests. Four dimensionally stable TIR-2000 electrodes (as in Example 3) were employed as the anodes. The active facial area of the anodes was 0.16 $ft^2$ based on one side of the anode (0.32 $ft^2$/anode). The cell current was 4.8 amps producing a cathode current density of 10 amps/$ft^2$ (1.6 amps/cathode) based on the facial area of plate on one side of a cathode. This produced a cell voltage of 4.0 volts. Additionally the cathode plating current efficiency was 14 percent, and the DC power consumption of the cell per pound of metal removed was 11 kilowatt-hrs/lb of nickel removed. FIG. 4 illustrates the nickel concentration as a function of time for the runs. The nickel metal removal efficiency was 94 percent.

EXAMPLE 7

Ammoniacal Copper Etchant Rinse Water Treatment

The reticulate electrode cell system has been used for the removal of copper in a simulted rinse solution. The metal cation, $Cu^{2+}$, was electrochemically plated out as a neutral metal onto the cathode, and the conjugate anion, $Cl^-$, was left untreated for these tests. The anode electrochemical reaction was the evolution of oxygen with the subsequent protonation of the rinse solution.

The tests were conducted as batch operations on the lab scale for 165 minutes with a batch size of 3.2 gallons (12 liters). The flow rate of the simulated rinse was ½ gallon per minute in which the system was operated in the recirculating mode with 28 passes made of the system reservoir (3.2 gal). The initial concentration was 790 ppm, and the final concentration was 12 ppm. The pH of the system was initially 10.0 dropping to a final pH of 9.5. The type of cathode employed was the copper plated reticulate polyurethane electrode, as in Example 1, ¼ inch thick with an average pore size of 33 mils (30 ppi foam). The area of plate of one side onto the reticulate cathodes was 0.16 $ft^2$ and 3 cathodes were used in the cell for these tests. Four TIR-2000 electrodes (as in Example 3) were employed as the anodes. The active facial area of the anodes was 0.16 $ft^2$ based on one side of the anode (0.32 $ft^2$/anode). The cell current was 4.8 amps producing a cathode current density of 10 amps/$ft^2$ (1.6 amps/cathode) based on the facial area of plate on one side of a cathode. This produced a cell voltage of 3.6 volts. Additionally the cathode plating current efficiency was 60 percent, and the DC power consumption of the cell per pound of metal removed was 2.3 kilowatt-hr/lb of copper removed. FIG. 5 illustrates the copper concentration as a function of time for the runs. The copper metal removal efficiency was 98 percent.

EXAMPLE 8

Electroless Copper Rinse Water Treatment

The reticulate electrode cell system has been used for the removal of copper in a simulated rinse solution. The metal cation, $Cu^{2+}$, was electrochemically plated out as a neutral metal onto the cathode with the conjugate anions and chelating agents left untreated for these tests. The anode electrochemical reaction was the evolution of oxygen with the subsequent protonation of the rinse solution.

The tests were conducted as batch operations on the lab scale for 135 minutes with a batch size of 4 gallons (15 liters). The flow rate of the simulated rinse was one gallon per minute in which the system was operated in the recirculating mode with 37 passes made of the system reservoir (4 gal). The initial concentration was 132 ppm, and the final concentration was 1.2 ppm. The pH of the system was initially 5.3 dropping to a final pH of 3.6. The type of cathode employed was the copper plated, reticulate polyurethane electrode, as in Example 1, ¼ inch thick with an average pore size of 33 mils (30 ppi foam). The area of plate of one side onto the reticulate cathodes was 0.16 $ft^2$ and 3 cathodes were used in the cell for these tests. Four TIR-2000 electrodes (as in Example 3) were employed as the anodes. The active facial area of the anodes was 0.16 $ft^2$ based on one side of the anode (0.32 $ft^2$/anode). The cell current was 3 amps producing a cathode current density of 6.3 amps/$ft^2$ (one amp/cathode) based on the facial area of plate on one side of a cathode. This produced a cell voltage of 3.8 volts. Additionally, the cathode plating current efficiency was 22 percent, and the DC power consumption of the cell per pound of metal removed was 6.2 kilowatt-hrs/lb of copper removed. FIG. 6 illustrates the copper concentration as a function of time for the runs. The copper removal efficiency was 99 percent.

We claim:

1. An electrolytic process for removing a significant portion of at least one metal contaminant from waste water comprising electrolyzing said waste water between a plurality of electrically energized anodes and cathodes arranged in an alternating sequence without either membrane or diaphragm separators therebetween, each of said anodes having openings therein permitting passage of such waste water therethrough and each of said cathodes being in the form of metallized organic polymer foam reticulates.

2. A process as in claim 1 wherein said foam is polyurethane foam.

3. A process as in claim 1 wherein the metal used to metallize said foam is copper.

4. A process as in claim 1 wherein the metal used to metallize said foam is nickel.

5. A process as in claim 1 wherein said metal contaminant is copper.

6. A process as in claim 1 wherein said metal contaminant is nickel.

7. A process as in claim 1 wherein said metal contaminant is zinc.

8. A process as in claim 1 wherein said metal contaminant is cadmium.

9. An electrolytic process for removing a significant portion of at least one metal contaminant while concurrently eliminating some cyanide contained in waste water comprising electrolyzing said waste water by circulating same through a plurality of electrically energized anodes and cathodes arranged in an alternating sequence without either membrane or diaphragm separators therebetween, each of said anodes and cathodes being formed of metallized organic polymer foam reticulates.

10. A process as in claim 9 wherein said reticulate anodes are metallized with nickel.

11. A process as in claim 9 wherein said reticulate cathodes are metallized with copper.

* * * * *